(12) United States Patent
Igel et al.

(10) Patent No.: US 9,982,551 B2
(45) Date of Patent: May 29, 2018

(54) SYSTEM FOR SEALING AN OIL CHAMBER FROM AN ADJOINING EXTERIOR VOLUME AND TURBO-MACHINE PROVIDED WITH SUCH A SEALING SYSTEM

(71) Applicant: SNECMA, Paris (FR)

(72) Inventors: Dominik Igel, Moissy-Cramayel (FR); Delphine Leroux, Moissy-Cramayel (FR)

(73) Assignee: SNECMA, Paris (FR)

( * ) Notice: Subject to any disclaimer, the term of this patent is extended or adjusted under 35 U.S.C. 154(b) by 547 days.

(21) Appl. No.: 14/362,490

(22) PCT Filed: Dec. 5, 2012

(86) PCT No.: PCT/FR2012/052810
§ 371 (c)(1),
(2) Date: Jun. 3, 2014

(87) PCT Pub. No.: WO2013/083917
PCT Pub. Date: Jun. 13, 2013

(65) Prior Publication Data
US 2014/0334913 A1 Nov. 13, 2014

(30) Foreign Application Priority Data

Dec. 8, 2011 (FR) ..................... 11 61330

(51) Int. Cl.
*F01D 11/04* (2006.01)
*F04D 29/10* (2006.01)
(Continued)

(52) U.S. Cl.
CPC ............ *F01D 11/04* (2013.01); *F01D 11/001* (2013.01); *F01D 25/183* (2013.01); *F02C 7/28* (2013.01);
(Continued)

(58) Field of Classification Search
CPC ........ F04D 29/10; F04D 29/102; F04D 29/12; F04D 29/122; F04D 29/124;
(Continued)

(56) References Cited

U.S. PATENT DOCUMENTS 6,012,723 A * 1/2000 Beeck .................. F16J 15/3288
277/355
2004/0013516 A1 1/2004 Casoni
(Continued)

FOREIGN PATENT DOCUMENTS

EP 2 071 131 6/2009
EP 2 305 956 4/2011
(Continued)

OTHER PUBLICATIONS

International Search Report dated Apr. 19, 2013 in PCT/FR12/052810 Filed Dec. 5, 2012.

*Primary Examiner* — Logan Kraft
*Assistant Examiner* — Joshua R Beebe
(74) *Attorney, Agent, or Firm* — Oblon, McClelland, Maier & Neustadt, L.L.P.

(57) ABSTRACT

A system for sealing an oil chamber from an adjoining exterior volume, and a turbo-machine including a sealing system. The system for sealing the oil chamber from the adjoining exterior volume, both of which are delimited by a mobile rotor in rotation about an axis and a part, fixed or mobile, includes: a first seal arranged between the rotor and the part; a second seal that is mounted between the rotor and the part and which is offset longitudinally relative to the first seal, to form with the first seal a sealing chamber delimited by the rotor, the part, and the two seals; and a mechanism for supplying gas to the sealing chamber, such that the gas can be compressed when the rotor begins to rotate, the chamber communicating with the oil chamber and/or the adjoining (Continued)

exterior volume via the first and second seals alone, respectively.

9 Claims, 1 Drawing Sheet

(51) Int. Cl.
    *F01D 11/00*     (2006.01)
    *F01D 25/18*     (2006.01)
    *F02C 7/28*     (2006.01)
    *F16J 15/42*     (2006.01)
    *F16J 15/40*     (2006.01)

(52) U.S. Cl.
    CPC ............. *F16J 15/406* (2013.01); *F16J 15/42* (2013.01); *F05D 2240/55* (2013.01); *F05D 2240/57* (2013.01); *F05D 2260/98* (2013.01)

(58) Field of Classification Search
    CPC ............. F05D 2240/61; F05D 2240/63; F05D 2240/52; F05D 2240/55; F05D 2260/98; F02C 7/28; F01D 11/04; F01D 11/001; F16J 15/42; F16J 15/406
See application file for complete search history.

(56) References Cited

U.S. PATENT DOCUMENTS

| | | |
|---|---|---|
| 2005/0132706 A1 | 6/2005 | Fukutani et al. |
| 2007/0137221 A1* | 6/2007 | Charier ................... F01D 5/082 60/806 |
| 2008/0085183 A1* | 4/2008 | Durocher .............. F01D 11/001 415/170.1 |
| 2009/0185895 A1* | 7/2009 | Wieghardt ................ F01D 3/04 415/104 |
| 2009/0189356 A1 | 7/2009 | Gaebler et al. |
| 2009/0274548 A1* | 11/2009 | Joco ........................ F01D 11/02 415/112 |
| 2010/0104418 A1* | 4/2010 | Weidmann .............. F01D 5/025 415/111 |
| 2011/0072831 A1 | 3/2011 | Tanimura |

FOREIGN PATENT DOCUMENTS

| | | |
|---|---|---|
| GB | 2 401 912 | 11/2004 |
| WO | 02 48525 | 6/2002 |

* cited by examiner

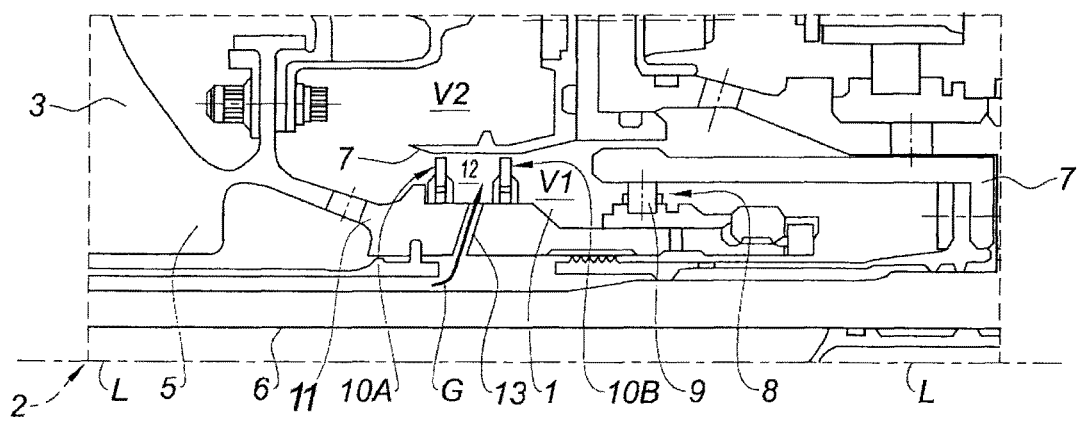

SYSTEM FOR SEALING AN OIL CHAMBER FROM AN ADJOINING EXTERIOR VOLUME AND TURBO-MACHINE PROVIDED WITH SUCH A SEALING SYSTEM

BACKGROUND OF THE INVENTION

Field of the Invention

The present invention relates to a system for providing a seal between two volumes subject to different pressures and situated around a rotary part, and also a turbine engine equipped with such a sealing system.

In particular, the present invention is particularly well adapted, although not exclusively so, to the sealing problems encountered in a turbine engine, in particular a turboshaft engine for an aircraft.

Description of the Related Art

Such a turboshaft engine generally comprises, from upstream to downstream in the direction of flow of the gases, a fan, one or more than one compressor stage, for example a low-pressure compressor and a high-pressure compressor, a combustion chamber, one or more than one turbine stage, for example a high-pressure turbine and a low-pressure turbine, and a gas exhaust pipe. A turbine can correspond to each compressor, the two being connected by a part, thus forming, for example, a high-pressure body and a low-pressure body.

The turbojet engine has bearing chambers containing rolling bearing units and gear units lubricated by oil. The oil, thrown off by these parts in rotation, forms a mist of droplets in suspension in the corresponding volume of the bearing chambers (hereinafter referred to as oil chambers inasmuch as they contain a suspension of oil droplets).

The oil chambers can be formed and delimited by surfaces of the fixed structure of the turbojet engine, but also by surfaces of rotating elements. The oil chambers must retain the oil within them and it is for this reason that the seal between the fixed elements and the rotating elements of an oil chamber is a particularly difficult problem, because it involves preventing any leakage of oil into the external annular volumes adjacent to said oil chambers.

Also, in a known manner, the sealing of such an oil chamber comprising one or more than one bearing, arranged between the high-pressure body and the low-pressure body or a fixed part of the turboshaft engine, can be produced using a labyrinth seal, an annular carbon seal or any other type of seal. A particular level of pressure must be provided upstream of the seal in order to create a flow of gas towards the chamber, these gases opposing the outflow of oil via said joint. The difference in pressure is defined in such a way as to be sufficient when the turboshaft engine is at idling speed, which requires the removal of the gas at stages downstream of the low-pressure compressor or the high-pressure compressor.

However, the removal of gas at such downstream stages results, in particular, in the following two disadvantages:
- the high temperature of the gas leads to accelerated ageing of the oil in the chamber, which cannot be satisfactory; and
- the efficiency of the turboshaft engine is noticeably reduced.

BRIEF SUMMARY OF THE INVENTION

The aim of the present invention is to improve the seal between an oil chamber of a turbine engine and the neighbouring exterior annular volume, without impairing the efficiency of the turbine engine, or causing the oil to age prematurely.

To that end, according to the invention, the system for sealing an oil chamber from an adjoining exterior volume, which are delimited by a rotor movable in rotation about an axis and a fixed or movable part, said system comprising a first seal arranged between said rotor and said part, is distinctive in that it has:
- a second seal which is mounted between the rotor and the part and which is offset longitudinally relative to the first seal, so as to form with the first seal a sealing chamber delimited by the rotor, the part and the two seals;
- and means for supplying the sealing chamber with gas, such that the gas can be compressed by setting the rotor in rotation, the chamber communicating with the oil chamber and/or the adjoining exterior volume through, respectively, the first and second seals alone.

Thus, by virtue of the invention, the sealing chamber defined between the first and second seals can be supplied with gas which, during the rotation of the rotor, is compressed under the effect of the centrifugal force being applied thereto. Thus, the pressure prevailing in the sealing chamber becomes greater than the pressures prevailing in the oil chamber and the adjoining exterior volume respectively, which prevents the oil in the chamber from passing through one or other of the two seals in order to come out in the volume external to the chamber. In other words, the sealing of the oil chamber is provided, firstly, by the presence of a pair of seals and, secondly, by the pressurisation of the gas remaining in the sealing chamber encouraging the flow of the gas towards the oil chamber while preventing oil from entering the sealing chamber. The combined effect of the pair of seals and of the pressurisation of the gas thus makes it possible to obtain an outstanding seal, even during moderate rotation of the rotor (corresponding, for example, to the idling speed of a turbine engine) and without additional oil consumption (oil losses being non-existent, or almost non-existent).

In an embodiment according to the present invention, the supply means are provided, at least in part, in the rotor.

Preferably, the supply means comprise at least one channel which is made in the rotor and which leads into the sealing chamber.

Furthermore, at least a portion of said channel can be inclined relative to the axis of the rotor and/or belong to a plane transverse to the axis of the rotor (in which said portion can be inclined tangentially) so that the gas emerges in the sealing chamber in a direction orthogonal to said axis of the rotor.

Advantageously, said supply means comprise a plurality of channels, which are distributed regularly about the axis of the rotor and which lead into said sealing chamber, to supply it uniformly with gas.

Furthermore, the first and second seals, preferably annular, can be mounted on the rotor.

The present invention also relates to a turbine engine, in particular a turboshaft engine of an aircraft, comprising at least one oil chamber and one adjoining exterior volume which are delimited by a rotor movable in rotation about an axis and a fixed or movable part. According to the invention, said turbine engine comprises at least one system as described above capable of providing a seal between the oil chamber and the adjoining exterior volume.

In addition, the gas supplying the sealing chamber of said system is taken from an upstream stage of the turbine engine (for example, from a fan, a low-pressure compressor, etc.) or from the exterior of said turbine engine.

Thus, the temperature of the gas injected into the sealing chamber remains low, which prevents any accelerated deterioration of the oil present in the oil chamber when it is in contact with the gas.

In addition, the rotor of the turbine engine preferably corresponds to a body associated with a high-pressure turbine.

Furthermore, said part can be:
either fixed and correspond, in this case, to the stator of the turbine engine. In this configuration, the oil chamber can comprise at least one plain bearing defined between the fixed part (namely the stator) and the rotor (corresponding to the body associated with the high-pressure turbine);
or movable and, in this case, correspond to a body associated with a low-pressure turbine. In this other configuration, the oil chamber can have at least one inter-shaft bearing which is defined between the movable part (namely the body associated with the low-pressure turbine) and the rotor (corresponding to the body associated with the high-pressure turbine).

BRIEF DESCRIPTION OF THE SEVERAL VIEWS OF THE DRAWINGS

The single drawing appended will give a clear understanding as to how the invention can be embodied. In this drawing, identical reference numerals designate similar elements.

FIG. 1 is a diagrammatic illustration, in partial axial cross-section, of an oil chamber of a turboshaft engine of an aircraft, which is sealed by a sealing system according to the present invention.

DETAILED DESCRIPTION OF THE SUMMARY

In FIG. 1, an oil chamber 1 of an aircraft turboshaft engine 2 according to the invention has been shown diagrammatically.

The turboshaft engine 2 has, in a known manner, a fan, a low-pressure compressor, a high-pressure compressor, a combustion chamber, a high-pressure turbine 3, a low-pressure turbine and an exhaust pipe. The high-pressure compressor and the high-pressure turbine 3 are connected to one another by a drum extending in an upstream direction via a casing and together they form a high-pressure body 5. The low-pressure compressor and the low-pressure turbine are connected by a low-pressure shaft 6 and with it they form a low-pressure body 7.

The turbojet engine 2 has static (or fixed) members and rotating members, forming the different functional elements above, in a known manner. It extends generally along an axis L-L which is the axis of rotation of its rotating members and in particular the axis of the low-pressure shaft 6 and of the casing. In the remainder of the description, the concepts of longitudinal, radial, inner and outer are relative to this axis L-L.

In addition, the turbojet engine 2 has oil chambers (or bearing chambers), including the downstream oil chamber 1 shown in FIG. 1 that has a bearing 8 fitted with bearing rollers 9, in order to provide the rotary connection between the high-pressure body 5 and the low-pressure body 7.

The invention will now be described, as an illustrative example, in relation to the oil chamber 1, but it goes without saying that it applies to any other chamber containing or accommodating members with a mist of oil to lubricate them.

The oil chamber 1 defines an annular inner volume V1 via surfaces of fixed members and rotating members. It is, in particular, delimited, on its inner side, by a portion of the high-pressure body 5 and, on the outer side, by a portion of the low-pressure body 7 (partially illustrated) rigidly connected to the low-pressure shaft 6.

In addition, an annular volume V2, arranged outside the chamber 1 on the upstream side thereof, is also defined by a portion of the high-pressure body 5, on the inner and upstream side, and by a portion of the low-pressure body 7, on the downstream side.

According to the invention, as FIG. 1 shows, in order to seal the oil between the two annular volumes V1 and V2 and prevent the oil (which enables the bearings to be lubricated) from coming into contact with the hot parts, the turboshaft engine 2 comprises two annular carbon seals 10A and 10B which are fitted to the journal 11 of the high-pressure body 5 in order to be disposed between said high-pressure body and the low-pressure body 7. The seals 10A and 10B are spaced longitudinally from one another by a predefined separation distance.

Of course, as a variant, the pair of seals could have labyrinth seals, brush seals, or any other appropriate type of seal enabling sealing to be provided between the two annular volumes.

Thus, the annular volume delimited by the journal 11, the low-pressure body 7 and the pair of seals 10A and 10B forms a sealing chamber 12.

In addition, in the example, channels 13 are provided in the thickness of the journal 11 and are supplied by gas circulating, from the source from which it is taken, between the sleeve and the low-pressure shaft 6. The channels 13 lead into the sealing chamber 12, in order to be able to supply it with gas (the gas being symbolised by the arrow G in FIG. 1).

The size and number of the channels 13 are adjusted according to the sealing desired and the size of the turboshaft engine 2.

Preferably, where the channels 13 have a circular transverse section, their diameter is included in the range between 3 mm and 10 mm, for a number of channels 13 included in the range between 10 and 40.

The gas G introduced via the channels 13 into the sealing chamber 12 can thus be taken at the outflow of the fan or of the low-pressure compressor of the turboshaft engine 2 or from outside the turboshaft engine 2 (the gas taken is, in the last case, ambient air), the temperature of the gas G restricting the premature ageing of the oil.

Preferably, the supply channels 13 are distributed regularly, around the longitudinal axis L-L, along the circumference of the journal 11. It goes without saying that any other arrangement of the supply channels could be envisaged, for example over two parallel circumferences of the journal 11.

In the example shown in FIG. 1, the downstream portion of the supply channels 13, provided in the journal 11, is inclined in a downstream direction relative to the axis L-L of the turboshaft engine 2. Of course, it could be envisaged that the downstream portion of said channels is orthogonal to the longitudinal axis L-L.

Thus, the sealing chamber 12 can receive, during the operation of the turboshaft engine 2, gas G originating from the fan (or from the low-pressure compressor). The rotation of the high-pressure body 6 will lead to compression of the gas G remaining in the sealing chamber 12, under the effect of the centrifugal force being applied to the gas G.

In this way, the pressure within the chamber 12 becomes greater than the pressures inside the oil chamber 1 and the exterior volume V2, thus preventing the oil from the chamber 1 from passing through either one of the two seals 10A and 10B in order to come out in the exterior volume V2.

In other words, the pair of seals 10A and 10B and the pressure remaining in the sealing chamber 12 cause a flow of gas G from the sealing chamber towards the oil chamber 1 and the exterior volume V2, while preventing oil from entering said chamber 12 and, a fortiori, the volume V2. Such a seal is guaranteed even at low operating speeds (such as idling speed), without consuming additional oil.

The invention claimed is:

1. A turbine engine or an aircraft turboshaft engine, comprising:
   an oil chamber and an adjoining exterior volume delimited by a rotor of a high-pressure turbine movable in rotation about an axis of the rotor of the high-pressure turbine and a fixed or movable part associated with a low-pressure turbine; and
   a system configured to provide a seal between the oil chamber and the adjoining exterior volume, the system comprising:
      a first seal arranged between the rotor of the high-pressure turbine and the part associated with the low-pressure turbine;
      a second seal mounted between the rotor of the high-pressure turbine and the part associated with the low-pressure turbine and which is offset longitudinally relative to the first seal;
      a sealing chamber delimited by the rotor of the high-pressure turbine, the part associated with the low-pressure turbine, and the first and second seals; and
      means for supplying the sealing chamber with gas, configured such that the gas can be compressed under the effect of centrifugal force applied thereto by setting the rotor of the high-pressure turbine in rotation, the sealing chamber communicating with the oil chamber and the adjoining exterior volume through the first and second seals respectively, the means for supplying comprising channels which are made in the rotor of the high-pressure turbine and which lead into the sealing chamber,
   wherein the channels have a circular transverse section, a diameter of which being included in a range between 3 mm and 10 mm, a number of channels being included in a range between 10 and 40, so as to allow a pressure prevailing in the sealing chamber to become greater than pressures prevailing in the oil chamber and the adjoining exterior volume, respectively.

2. A turbine engine according to claim 1, wherein at least a portion of each channel is at least one of inclined longitudinally relative to the axis of the rotor of the high-pressure turbine and belongs to a plane transverse to the axis of the rotor of the high-pressure turbine.

3. A turbine engine according to claim 1, wherein the channels are distributed regularly about the axis of the rotor of the high-pressure turbine.

4. A turbine engine according to claim 1, wherein the first and second seals are mounted on the rotor of the high-pressure turbine, or are annular mounted on the rotor of the high-pressure turbine.

5. A turbine engine according to claim 1, wherein the gas supplying the sealing chamber is taken from an upstream stage of the turbine engine or from an exterior of the turbine engine.

6. A turbine engine according to claim 1, wherein the part is fixed and corresponds to a stator of the turbine engine.

7. A turbine engine according to claim 1, wherein the part is movable and corresponds to a body associated with the low-pressure turbine.

8. A turbine engine according to claim 1, wherein the channels are directly supplied with gas circulating, from a source from which the gas is taken, between a sleeve and a rotor of the low-pressure turbine.

9. A turbine engine according to claim 8, wherein the sleeve is part of the rotor of the high-pressure turbine.

* * * * *